United States Patent [19]

Kaneko

[11] 4,130,128

[45] Dec. 19, 1978

[54] BALL VALVE WITH ORIFICE

[75] Inventor: Shiro Kaneko, Fujimiya, Japan

[73] Assignee: Fuji Photo Film Co., Ltd., Minami-ashigara, Japan

[21] Appl. No.: 760,021

[22] Filed: Jan. 17, 1977

Related U.S. Application Data

[63] Continuation of Ser. No. 596,953, Jul. 17, 1975, abandoned.

[30] Foreign Application Priority Data

Jul. 17, 1974 [JP] Japan .............................. 49-85275[U]

[51] Int. Cl.² ................................................ F16K 5/10
[52] U.S. Cl. ..................................... 137/269; 138/45; 251/207
[58] Field of Search ...................... 251/207, 208, 209; 137/269; 138/45 A

[56] References Cited

U.S. PATENT DOCUMENTS

| | | | |
|---|---|---|---|
| 421,224 | 2/1840 | Applegarth | 251/207 |
| 1,229,038 | 6/1917 | Cornelius | 251/207 |
| 1,633,161 | 6/1927 | Cavenagh | 251/206 X |
| 2,621,012 | 12/1952 | Graham | 251/207 |
| 3,326,232 | 6/1967 | Stamps et al. | 251/207 X |
| 3,352,155 | 11/1967 | Penet | 251/209 X |
| 3,386,461 | 6/1968 | Fisher | 251/207 X |
| 3,707,161 | 12/1972 | Crawford | 137/269 |

FOREIGN PATENT DOCUMENTS

| | | | |
|---|---|---|---|
| 784914 | 5/1935 | France | 251/207 |
| 791596 | 3/1958 | United Kingdom | 251/207 |

Primary Examiner—Arnold Rosenthal

[57] ABSTRACT

The through hole of the ball of a ball valve which resembles a cock is provided with an orifice on the side wall thereof. Opposite to the orifice on the side wall of the through hole is provided another through hole. By revolving the ball, the ball valve selectively serves as a ball valve or an orifice.

2 Claims, 5 Drawing Figures

BALL VALVE WITH ORIFICE

This is a continuation, of application Ser. No. 596,953, filed July 17, 1975, now abandoned.

BACKGROUND OF THE INVENTION

1. Field of the Invention

This invention relates to a ball valve, and more particularly to an improvement in a ball valve used for flow control. The ball valve in accordance with this invention is capable of acting as an orifice as well as a valve.

2. Description of the Prior Art

The ball valve is well known in the art as a valve used to control the flow of a fluid. The ball valve has a defect in that its control precision is considerably low. Even when a positioner is used to control the torque actuator of the ball valve, the control precision is as low as ± 10%. One of the reasons for the low control precision of the ball valve is that the position of the ball cannot be precisely controlled because of the hysteresis of the movement of the ball and the effect of the disturbance thereto since the position of the ball is controlled by an air pressure signal.

In order to perform more precise flow control in a fluid flow system wherein a ball valve is used, it has been necessary to employ an additional flow control device such as an orifice in the pipe line. Therefore, fluid flow systems capable of performing highly precise flow control have been complicated.

SUMMARY OF THE INVENTION

In view of the above described defects inherent in the conventional ball valve, the primary object of the present invention is to provide an improved ball valve which is capable of performing highly precise flow control.

Another object of the present invention is to provide a ball valve resembling a cock which can be selectively used as a ball valve or an orifice.

Still another object of the present invention is to provide a ball valve resembling a cock which can be selectively used as a ball valve or an orifice wherein the diameter of the orifice can easily be changed.

A further object of the present invention is to provide a ball valve resembling a cock which facilitates high-precision flow control.

The above objects are accomplished by providing an orifice in the side wall of a through hole of the ball of a ball valve. Opposite to the orifice in the side wall of the through hole is provided a hole to form a fluid passage with the orifice. By revolving the ball of the ball valve, the ball valve can be used selectively as a ball valve or an orifice. The orifice should preferably be made interchangeable with other orifices of different diameters. Since the orifice has high control precision of ± 0.2 to 3.0%, highly precise flow control can be performed by the ball valve of this invention.

In a preferred embodiment of this invention, the ball is also made interchangeable, and more than one orifices is provided in the side wall of the through hole of the ball so that a wide range of flow control is obtained.

DESCRIPTION OF THE PREFERRED EMBODIMENTS

Figure 1:
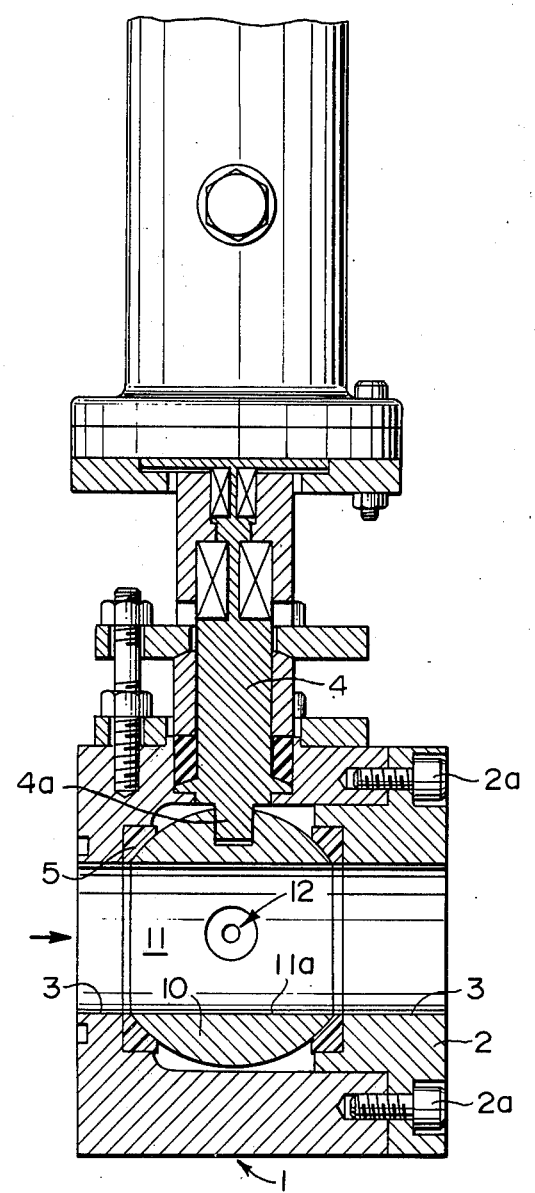
FIG. 1 is a vertical sectional side view of a ball valve in accordance with an embodiment of the present invention.
Figure 2:
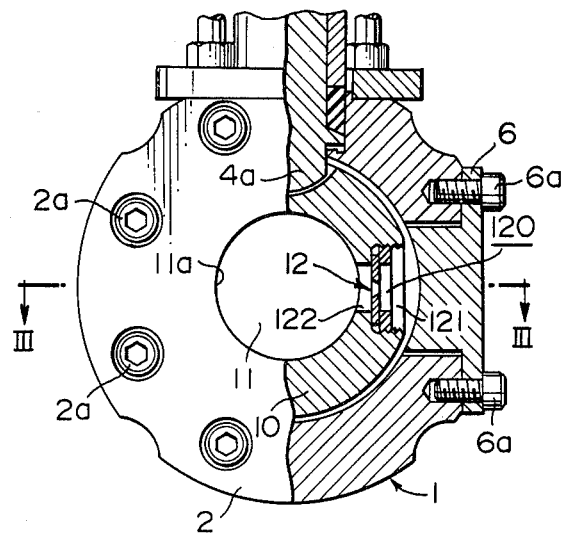
FIG. 2 is a partly sectional front view of the ball valve as shown in FIG. 1.

Referring to FIGS. 1, 2, 3 and 4 showing an embodiment of the present invention, a ball 10 is rotatably provided in a valve box 1. A cover 2 is removably fixed to the valve box 1 by means of bolts 2a to enable interchange of the ball 10. The ball 10 is rotatable about a vertical axis extending through the center thereof. A torque cylinder 4 for controlling the angular position of the ball 10 is located above the valve box 1 in engagement with the ball 10 by key means 4a.

The ball 10 is made of corrosion and abrasion resistive material such as stainless steel and provided with a through hole 11 to be aligned with a fluid flow passage 3 formed adjacent to the ball 10. The through hole 11 extends horizontally in the ball 10 and has substantially the same diameter as that of the fluid flow passage 3. Around the ends of the through hole 11 where the through hole 11 is communicated with the fluid flow passage 3 are provided packing seals 5 made of sealing material such as tetrafluoroethylene.

The through hole 11 of the ball 10 is provided with an orifice 12 on one side of the wall 11a thereof and a fluid passage 13 on the other side of the wall 11a. In more detail, in one side of the wall 11a of the through hole 13 is provided a first fluid passage 120 having a larger diameter part 121 on the outer side and a smaller diameter part 122 on the inner side. The larger diameter part 121 is provided on the internal surface thereof with a female screw 121a. An orifice plate 123 having an orifice 123a is fixed in the fluid passage 120 at the inner end of the larger diameter part 121 thereof being secured there by an orifice holding member 124 having an opening 124a. The orifice holding member 124 has a male screw on the outer periphery thereof and is screwed in the larger diameter part 121 of the fluid passage 120 to fix the orifice plate 123 at the inner end of the larger diameter part 121.

The valve box 1 is provided on the side wall thereof with a removable cover 6 to enable interchange of the orifice plate 123. The removable cover 6 is fixed to the valve box by means of bolts 6a and is removed from the valve box 1 when the orifice plate 123 is interchanged with a different orifice plate having an orifice of different diameter.

The ball 10 is further provided with a second fluid passage 13 extending through the ball 10 from the through hole 11 to the outer surface of the ball 10 on the opposite side of the through hole 11 to said orifice 12 to form a fluid flow passage with an orifice in the ball 10 extending at a right angle to the through hole 11.

Figure 3:
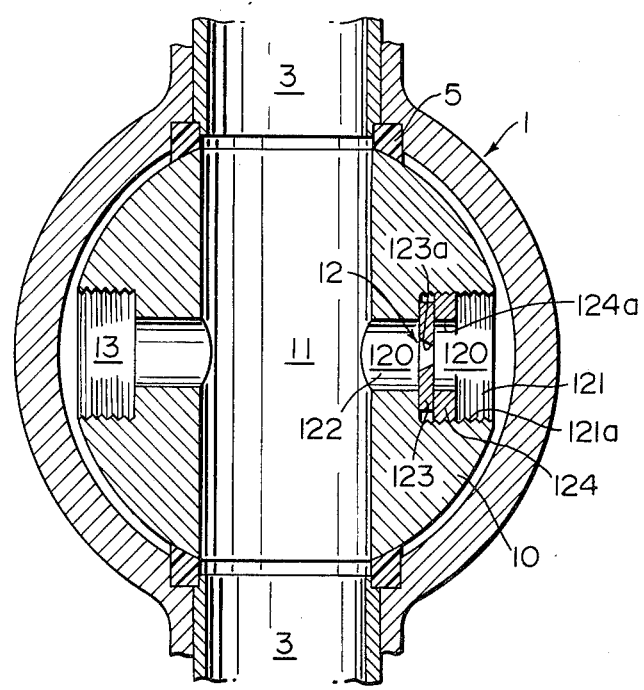
FIG. 3 is a horizontal sectional view of the ball valve as shown in FIG. 1 where the through hole of the ball valve is in alignment with the fluid flow passage.
Figure 4:
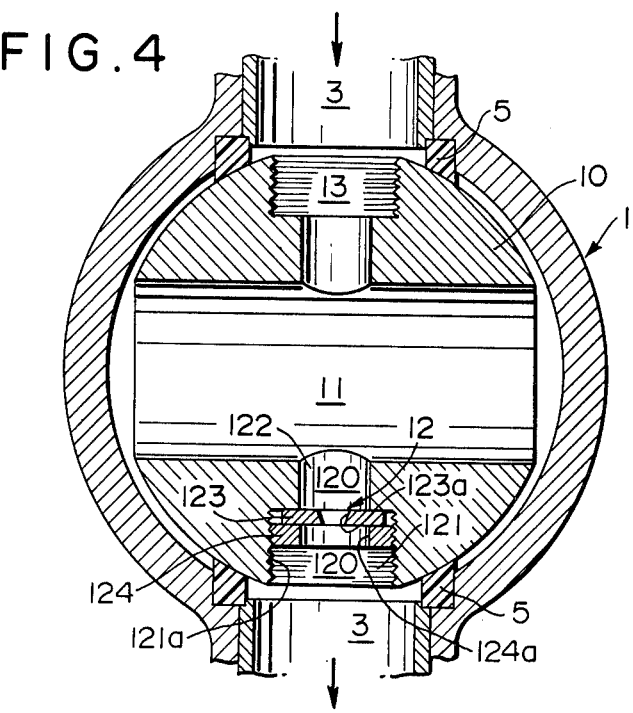
FIG. 4 is a horizontal sectional view of the ball valve as shown in FIG. 1 where the fluid passage with an orifice is in alignment with the fluid flow passage.

In operation of the ball valve in accordance with the present invention as described above, the ball 10 is rotated about its vertical axis by the torque cylinder 4 to selectively align the through hole 11 or the fluid passage 13 and the orifice 12 with the fluid flow passage 3. When the through hole 11 is in alignment with the fluid flow passage 3 as shown in FIG. 3, a large amount of fluid is allowed to flow through the valve. When the fluid passage 13 and the orifice 12 are in alignment with the fluid flow passage 3 as shown in FIG. 4, a precisely controlled amount of fluid is allowed to flow through the valve or the orifice. Thus, the ball valve in accordance with the present invention serves selectively as a ball valve or an orifice.

The ball valve in accordance with this invention can be used to control the flow of any type of fluid. Particularly, the ball valve of this invention is suitable for controlling the flow of chemical materials which greatly effect the characteristics of the material to which the chemical materials are to be added at the first stage of addition thereof, such as photosensitive emulsions or the like. In order to precisely control the amount of flow of various kinds of fluid in various reaction systems or liquid mixing systems, various sizes of orifices are properly selected and used in the ball valve.

Figure 5:
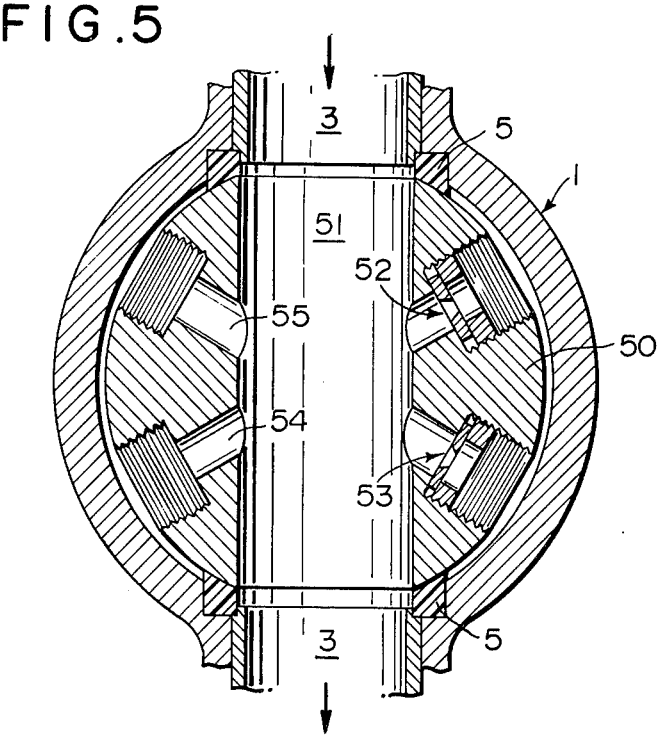
FIG. 5 is a horizontal sectional view of the ball valve in accordance with another embodiment of the present invention in which more than one orifice is provided in the ball.

A second embodiment of the present invention is illustrated in FIG. 5 in which two passages each having an orifice are provided in the ball beside the through hole of larger diameter. Referring to FIG. 5, a ball 50 is rotatably provided in a valve box 1. The ball 50 is provided with a through hole 51 extending straight through the ball 50 and two orifices 52 and 53 inclined at 60° with respect to the through hole 51. The orifices 52 and 53 are quite the same in structure as the orifice 12 in the first embodiment shown in FIGS. 1 to 4, and accordingly, a detailed description thereof is omitted here. The orifices 52 and 53 are in the same horizontal plane including the through hole 51 similarly to the first embodiment. Opposite to the orifices 52 and 53 are provided second and third fluid passages 54 and 55 in the ball 50 to form second and third straight fluid passages with orifice in the ball 50.

In operation of the ball valve in accordance with the second embodiment of this invention, the ball 50 is rotated about its vertical axis by 60° to change the flow rate from one valve to another. When the through hole 51 is in alignment with the fluid passage 3 as shown in FIG. 5, a large amount of fluid is allowed to flow through the ball valve. When the ball 50 is rotated clockwise (in FIG. 5) by 60° from the position shown in FIG. 5, the orifice 53 is brought into alignment with the fluid flow passage 3 and a certain amount of fluid determined by the diameter of the orifice 53 is allowed to flow through the ball 50. Then, when the ball 50 is rotated clockwise further by 60°, the other orifice 52 is brought into alignment with the fluid flow passage 3 and a certain amount of fluid determined by the diameter of the orifice 52 is allowed to flow through the ball 50. By making the diameter of one orifice 52 different from the other orifice 53, three kinds of flow control can be effected.

In both, the first and second embodiments of the present invention, it should be noted that the diameter of the larger diameter part of the fluid passage in which the orifice 12, 52, 53 is provided and the diameter of the fluid passages 13, 54, 55 opposite to the orifices 12, 52, 53 must be made no larger than the diameter of the through hole 11, 51 so that the fluid passages 13, 54, 55 communicated with the fluid flow passage 3 of the valve will be sealed by the seal 4 without fail.

It will be noted that in the present invention more than two orifices can be employed. That is, more than two passages each having an orifice may be provided in the ball beside the through hole of large diameter.

By employing the ball valve in accordance with this invention, the flow control system in a pipe line is markedly simplified since several kinds of flow control can be effected by use of only one ball valve. Therefore, for instance, a pipe line need not be branched into two or three branch lines if the ball valve of this invention is inserted in the pipe line. As is well known in the art, a pipe line has often been divided into several branch lines which are provided with valve and orifice means of different rate of flow control in the conventional flow control system in which conventional ball valves are used.

I claim:

1. A ball valve comprising a valve housing, a fluid flow passage communicated with said valve housing on the opposite sides thereof, a ball having a first through hole for rough control of fluid flow rotatably provided in said valve housing, said ball being rotatable about an axis extending through the center thereof and extending at a right angle with respect to the first through hole and said fluid flow passage, said first through hole being brought into communication with said fluid flow passage by the revolution of the ball, a means for revolving said ball about said axis, a second through hole of smaller diameter than said first through hole extending through said ball at a certain angle with said first through hole in a plane including said through hole and extending perpendicular to said axis of revolution, and an interchangeable orifice for fine control of fluid flow removably mounted in said second through hole whereby rough or fine control of fluid flow is selectively conducted by selectively bringing one of said through holes into communication with said fluid flow passage, said orifice comprising an orifice plate having an orifice opening and an orifice holding member screwed into said fluid passage to hold said orifice plate in the fluid passage, and said valve housing being provided with a removable cover on one side thereof so that the orifice can be interchanged with a different orifice.

2. A ball valve comprising a valve housing, a fluid flow passage communicated with said valve housing on the opposite sides thereof, a ball having a first through hole for rough control of fluid flow rotatably provided in said valve housing, said ball being rotatable about an axis extending through the center thereof and extending at a right angle with respect to the first through hole and said fluid flow passage, said first through hole being brought into communication with said fluid flow passage by the revolution of the ball, a means for revolving said ball about said axis, a second through hole of smaller diameter than said first through hole extending through said ball at a certain angle with said first through hole in a plane including said through hole and extending perpendicular to said axis of revolution, and interchangeable orifice for fine control of fluid flow removably mounted in said second through hole whereby rough or fine control of fluid flow is selectively conducted by selectively bringing one of said through holes into communication with said fluid flow passage, said orifice comprising an orifice plate having an orifice opening and an orifice holding member screwed into said fluid passage to hold said orifice plate in the fluid passage, and further comprising a third through hole extending through said ball at a different angle from said certain angle with respect to said first through hole in said plane, and a second orifice provided in said third through hole.

* * * * *